Figure 1:
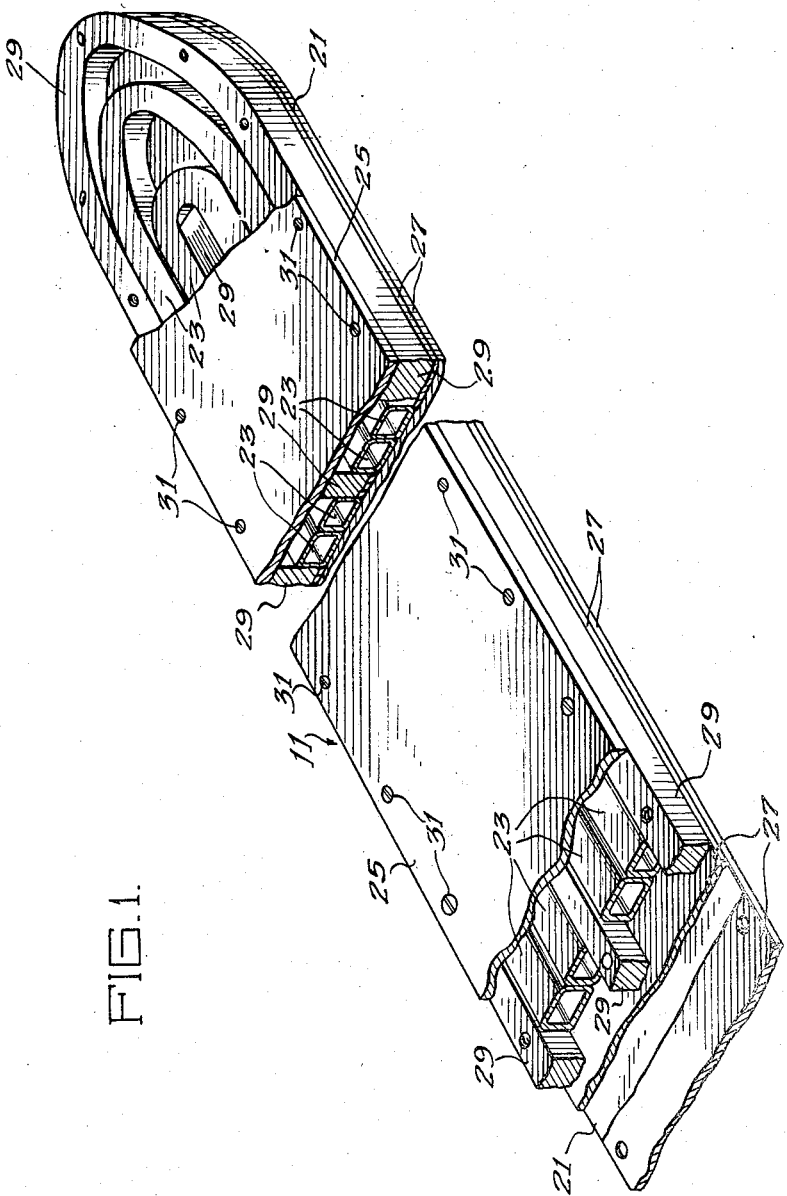
Figure 5:
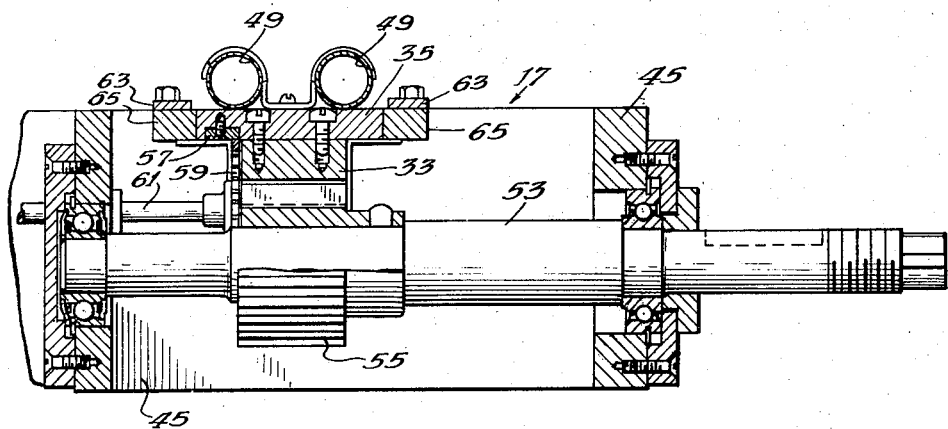
Figure 6:
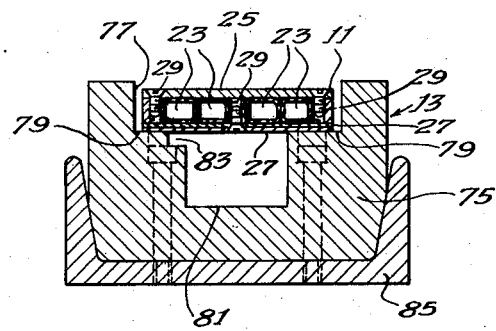

Oct. 7, 1958     H. L. ANDERSON     2,855,354
NEUTRONIC REACTORS

Filed April 19, 1945     4 Sheets—Sheet 1

Witnesses:
Herbert E. Metcalf
Paul J. Glaister

Inventor:
Herbert L. Anderson
By: Robert A. Tanender
Attorney.

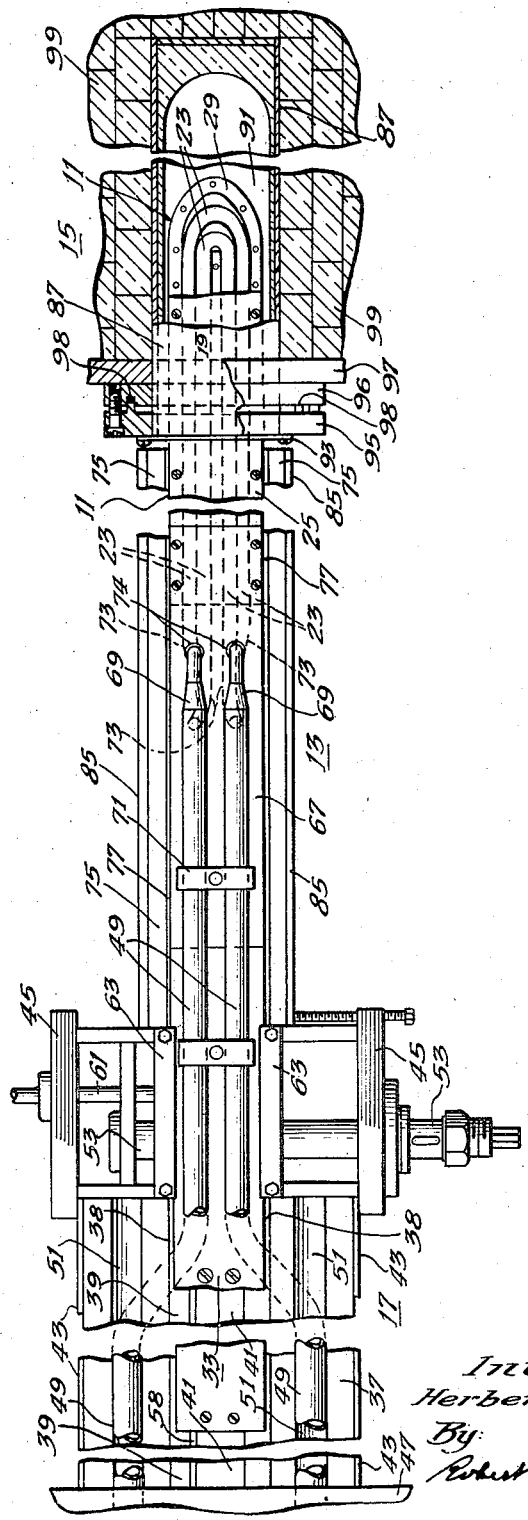

Oct. 7, 1958  H. L. ANDERSON  2,855,354
NEUTRONIC REACTORS
Filed April 19, 1945  4 Sheets-Sheet 3
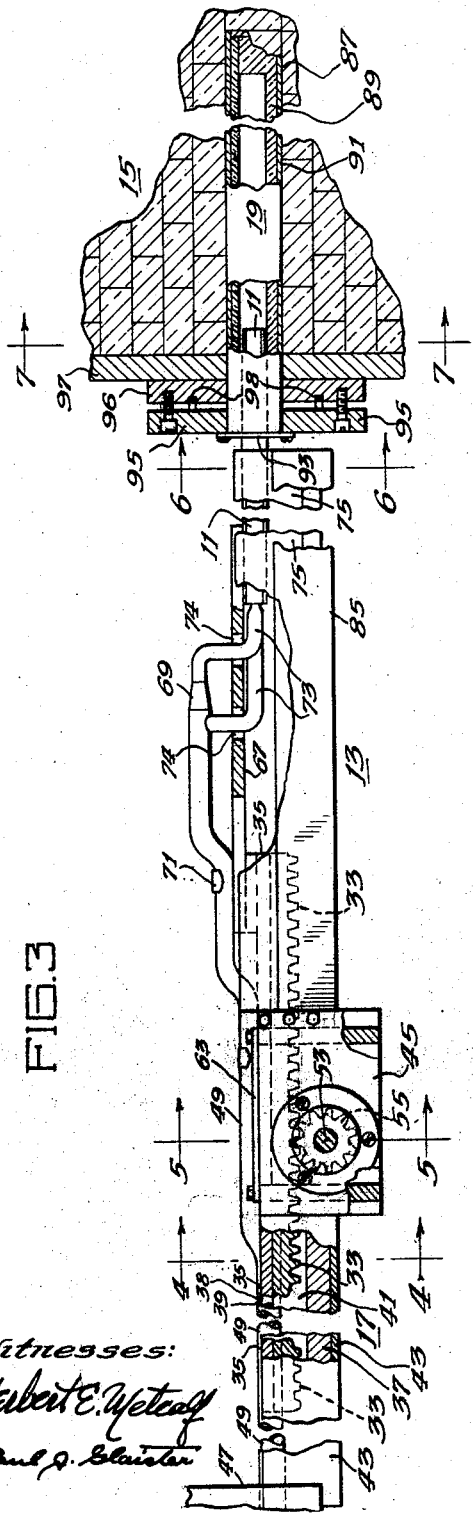
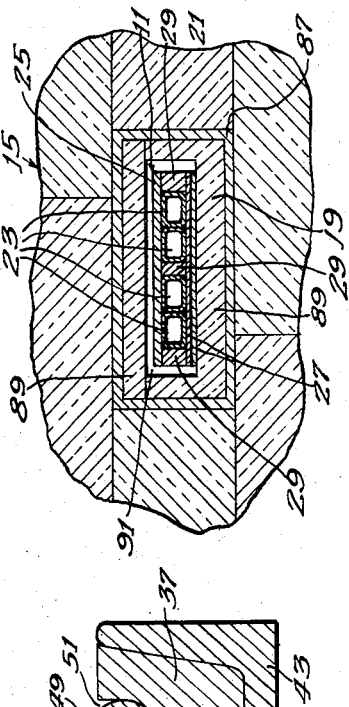
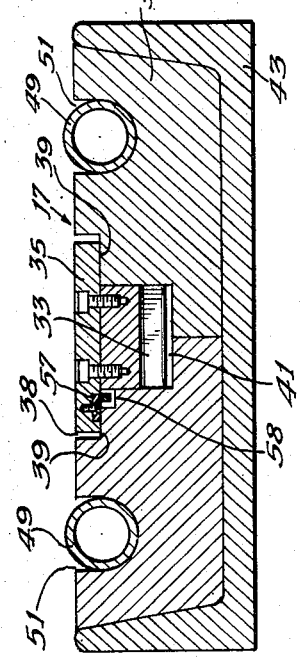
Inventor:
Herbert L. Anderson
By:
Robert A. Lavender
Attorney Oct. 7, 1958     H. L. ANDERSON     2,855,354
NEUTRONIC REACTORS Filed April 19, 1945     4 Sheets-Sheet 4

Witnesses:
Herbert E. Metcalf
Paul J. Glaister

Inventor:
Herbert L. Anderson
By Robert A. Lavender
Attorney.

United States Patent Office 2,855,354
Patented Oct. 7, 1958

2,855,354

NEUTRONIC REACTORS

Herbert L. Anderson, Hartford, Conn., assignor to the United States of America as represented by the United States Atomic Energy Commission Application April 19, 1945, Serial No. 589,226

13 Claims. (Cl. 204—193.2)

The present invention relates to control apparatus for neutronic reactor systems and is particularly concerned with a liquid cooled control rod for use with a high capacity neutronic reactor.

A neutronic reactor system, as the term is used herein, constitutes a complete system designed for initiating and carrying out chain nuclear reactions. Such systems include a neutronic reactor wherein fast neutrons are developed by the absorption of other neutrons to cause fission of a chain reacting fissionable material and wherein such neutrons are slowed to thermal energies and reserved for sustaining the reaction, control apparatus for initiating and controlling the progress of the reaction, and shielding means for protecting the personnel from the radiations developed during the operation of the system. The usual neutronic reactor comprises a plurality of bodies of fissionable material, such as uranium metal, or other composition containing $U^{235}$, $U^{233}$, or $94^{239}$ generally arranged in a symmetrical, spatial lattice with a suitable neutron moderating substance, such as carbon, heavy water, oxygen, or beryllium, occupying the interstices of the lattice. The moderating substance has the function of slowing down the fast neutrons released as an incident to the fission process, thereby making available thermal or low energy neutrons which are capable of producing further fissions and thus continuing the reaction.

In order that a neutronic reactor may be a practical device for the production of power, it is necessary that the reactor shall be inherently capable of producing a greater number of neutrons than are required to maintain the chain reaction, because it is only by an increase in the rate of neutron production that the power output of a neutronic reactor can be increased. The neutron production capacity of a neutronic reactor may now be determined by calculation with reasonable accuracy inasmuch as a number of such reactors have been built and operated and the rate of neutron production is, of course, susceptible of measurement after a reactor has been built; it is generally designated as the reproduction ratio of the reactor. When a reactor has been built and placed in operation and the reproduction ratio made equal to unity the power output of the reactor will continue at an even rate. Increases or decreases in the reproduction ratio will effect increases or decreases in the power output. Specific details of several typical neutronic reactors are described in Fermi et al., Patent 2,708,656, dated May 17, 1955.

These operational characteristics of a neutronic reactor, which make it necessary that the reactor have a reproduction ratio greater than unity for initiating the neutronic reaction, give rise to the further requirement that the reactor system shall include control means capable of lowering the reproduction ratio from the maximum value possible by virtue of the design of the reactor to unity, which is the normal operating condition when a predetermined power output has been reached, and to less than unity when it is desired to stop the reactor. The most convenient means of accomplishing this control consists in the introduction into the reactor of a control member known as a control rod which is constructed at least in part of a material having high neutron capture capabilities as, for example, cadmium or boron.

The principal object of the present invention, therefore, is to provide a novel control rod structure for use in connection with high power capacity neutronic reactors. An ancillary object of the invention is to provide a control rod for high capacity neutronic reactors which will not overheat when the reactor is operating at large power outputs and which by nature of construction minimizes radiation escape from the reactor.

As will hereinafter appear these objects are accomplished by the provision of a novel, fabricated, control rod structure which includes means for circulating a cooling fluid such as water through the rod structure during its operation. The various details of the rod construction of the invention and the novel features included therein will be made more apparent in the following description and the accompanying drawings of one preferred embodiment thereof. In the drawings, Fig. 1 is a perspective view, partially in section and partially cut away, of a control rod in accordance with the present invention;

Fig. 2 is a plan view, partially cut away, showing a control rod of the type illustrated in Fig. 1 together with the support and operating means thereof and a portion of the associated reactor structure;

Fig. 3 is a side elevational view, partially in section and partially cut away, of the apparatus illustrated in Fig. 2; and Fig. 4, 5, 6 and 7 are enlarged sectional views taken, respectively, on the line 4—4, 5—5, 6—6, and 7—7 of Fig. 3.

The structure illustrated in the drawings consists of four main parts. These include the control rod itself, which is illustrated at 11 and is shown particularly in Fig. 1, support and guideway means 13 (Figs. 3 and 6) which supports the control rod 11 when it is out of the associated reactor 15 and which guides it into the reactor during the operation thereof, operating means 17 for moving the control rod into and out of the reactor, this means being of the rack and pinion type, and a guideway structure 19 which is provided inwardly of the reactor 15 for receiving and supporting the control rod 11 while it is within the reactor. The guideway 19 is of a size and contour such that a relatively close fit is established between the guideway and the rod to minimize escape of radiation along the guideway.

It will be appreciated that rather serious mechanical problems arise in connection with the satisfactory operation of a control rod of this type for the reason that such rods are of considerable length. For example, the control rods for reactors of about 500,000 kw. capacity may have a length of the order of from 30 to 40 feet. This necessitates the use of a guide structure inside the reactor of comparable length, and a support and guide external to the reactor of the same length. Further, when a rack and pinion operating means is used, as in the structure illustrated, the rack must likewise have a length of from 30 to 40 feet. The overall dimensions of the complete apparatus thus become quite large, and to avoid mechanical difficulties the various parts must be accurately and carefully machined and assembled.

The active portion of the control rod 11 illustrated in the drawings comprises an elongated, relatively narrow thin sheet 21 of cadmium metal which is supported and is held in thermally conductive relationship with a pair of rectangularly shaped tubes 23 containing a liquid coolant by means of a rigid, elongated framework. To minimize the objectionable radioactivity developed in cadmium by fast neutrons, the cadmium sheet should be sufficiently thin to be able to absorb thermal neutrons to a large degree without absorption of a substantial quantity of fast neutrons. Foils less than 0.01 inch in thickness are generally used. The framework is rectangular in cross section and includes an upper cover plate 25 and a composite lower plate 27 consisting of two thin strips of metal which are laminated together with the cadmium sheet 21 therebetween. The plates 25 and 27 are fastened together and are held in thermal conductive relationship with the tubes 23 by means of rectangularly shaped spacer bars 29 and a plurality of flat headed screws 31 which engage suitable threaded openings in the spacer bars 29. In a particular commercial embodiment, the top and bottom plates 25 and 27 constitute strips of sheet metal having a width of approximately 3 inches and a length of 35 feet. In a typical control rod the upper plate 25 may have a thickness of ⅛ inch and the composite lower plate 27 may comprise two sheets 1/16 inch thick with the cadmium sheet 21, which comprises cadmium foil 0.005 inch thick, sandwiched therebetween. The spacer bars in this embodiment may be ⅜ inch thick, the outer bar which is curved back on itself as illustrated being approximately square and the inner rod being somewhat narrower in its transverse dimension.

The entire framework structure and the tubes 23 for containing the liquid coolant preferably should be of material having low neutron capture capabilities, and particular advantages result if these members are fabricated of aluminum, magnesium or nickel. The radioactive products formed when these metals are subjected to neutron irradiation are relatively short lived, and hence, a rod fabricated of this metal may be handled safely by personnel within a few days after it has been removed from the reactor. Further, such metals are good heat conductors (this characteristic facilitating the transfer of heat from the cadmium foil 21 to the coolant liquid) and are materials having low neutron activation capabilities.

In order to obtain the best possible thermal conductivity within the structure and hence the maximum rate of heat transfer from the active part of the control rod to the coolant liquid, it is desired that the tubes 23 which contain the liquid coolant shall be held in intimate contact with the other portions of the structure. It has been found that this desired contact can best be accomplished by making the tubes 23 from relatively thin walled, round stock having an outside diameter of 0.5 inch, the round tubes being pressed into square form so as to tightly engage the other portions of the support structure when that structure is fabricated. The two tubes 23 are continuous through the length of the control rod 11 and are bent back upon each other at the inner end of the control rod, as shown particularly in Fig. 1. The tubes 23 are connected to the source of liquid coolant in parallel with each other although other arrangements can, of course, be employed. The various parts of the control rod structure 11 which are fastened together by the flat headed screws 31 are slightly recessed in order that no portion of the screws shall extend above the surface of the upper and lower plate members 25 and 27. This permits the entire outer surface of the control rod 11 to be finished smoothly, thereby minimizing friction and preventing wearing of the rod guide structures 13 and 19 when the control rod is moved into and out of the associated reactor.

The operating means 17 provided for moving the control rod 11 into and out of the reactor 15 includes an elongated rack 33 rigidly attached to a rectangularly shaped bar 35 which is of the same length as the rack 33 and has a width equal to the width of the control rod 11. The bar 35 is adapted to rest in a support and guide member 37 which is provided with a rectangularly shaped groove 38 which provides a pair of supporting surfaces 39 for the bar member 35. The groove 38 has a deep central portion 41 for receiving the rack 33. The guide member 37 may be conveniently manufactured of bar steel. It is supportd by a steel channel 43 which is welded or otherwise rigidly attached at one end to a fabricated frame structure 45 (Figs. 2 and 3), which in turn, is supported upon a suitable base, not shown. The other end of the channel 43 is supported upon a second frame structure 47 which serves the further function of supporting a hose reel (not shown) utilized for holding a pair of hoses 49 which conduct the cooling liquid to and from the control rod tubes 23. The hoses 49 normally rest in suitable guideways 51 formed in the guide member 37.

The main frame 45 supports a shaft 53 which is provided with a pinion gear 55 adapted to engage the rack 33. A second rack 57, which is of small size and is very accurately machined, is affixed to the underside of the elongated bar member 35 as shown particularly in Figs. 4 and 5. A groove 58 is provided in the support and guide member 37 for clearing the rack 57. The rack 57 is adapted to engage a second gear 59, which is also accurately machined, supported on the main frame 45 by a shaft 61. It is contemplated that the shaft 61 for this second gear wheel 59 shall be connected to a Selsyn or other indicating means (not shown) for providing a positive, accurate indication of the longitudinal position of the control rod 11 relative to the reactor 15 at all times. In order to minimize any tendency of the interconnected bar 35 and rack 33 to bow when it is being moved backwardly and forwardly by the gear 55, the structure includes a pair of tie down strips 63 which are bolted to suitable bar portions 65 of the frame 45 which engage the bar 35 with a sliding fit.

The interconnected bar 35 and rack 33 are mechanically connected to the control rod 11 by a rectangularly shaped tie member 67, shown particularly in Figs. 2 and 3. The width of the tie member 67 is substantially equal to the width of the control rod 11 and the bar 35, and it has a length of about 2 feet. The tie member 67 overhangs both the control rod 11 and the bar 35, and it is bolted or otherwise connected to the control rod and to the bar 35.

The inlet and outlet hoses 49 for the cooling liquid are each connected to manifolds 69 which are supported on the tie member 67 adjacent the end of the rack bar 33 by a clamp 71. Each of the manifolds 69 includes a pair of connections 73 (see Fig. 3) which pass through suitable openings 74 in the tie member 67 to connect the manifolds 69 with the two inlet ends and the two outlet ends, respectively, of the tubes 23 provided in the control rod 11. The two connections 73 from the inlet manifold lead to the two tubes 23 at one side of the rod and the connections 73 from the outlet manifold lead to the ends of the two tubes 23 at the other side of the control rod. The tubes 23 are thus connected in parallel.

Since the control rod 11 may be moved from a position entirely without the reactor 15 to a position entirely within the reactor 15, it is necessary that support and guide means may be provided for the control rod 15 both internally and externally of the reactor. The external guide means 13 includes a guide member 75, which is shown particularly in Fig. 6, having a rectangularly shaped groove 77 which defines a pair of supporting surfaces 79 for the control rod 11, and for the rack bar 35 when the control rod is within the reactor. The groove 77 includes a deep central section 81 for clearing the main rack 33 and a section 83 for clearing the operating rack 57 for the position indicating means. As will be apparent from examination of the drawings, the undersurfaces of the control rod 11 and the rack bar 35 are at exactly the same level. Also, the rack bar 35 is of the same width as the control rod 11. This arrangement is necessary because the rack bar 35 is adapted to engage and rests upon the supporting surfaces 79 on the guide member 75 when the control rod 11 is within the reactor 15. The guide member 75 is itself supported by a steel channel 85 of suitable dimensions, one end of which is attached to the frame 45 and the other end of which is supported adjacent the reactor 15 by suitable means (not shown).

The guideway means 19 which supports and guides the control rod 11 internally of the reactor 15 is contained within an elongated, box-like closure 87, fabricated of metal having low neutron capture capabilities such as aluminum. The closure 87 extends into one side of the reactor and is completely closed on all sides except for an opening at the outer end through which the control rod is admitted. The interior of the closure 87 is lined with graphite blocks 89 as shown particularly in Fig. 7, and the dimensions of these blocks are such that a guideway 91 of suitable dimensions is provided for the control rod. The use of graphite for the closure lining material minimizes friction as the control rod 11 is moved through the guideway into and out of the reactor 15.

The guideway means 19 is enclosed within the box-like closure 87 for the reason that it is common practice in high capacity reactors to maintain the interior of the reactor filled with a gas, such as helium, under pressure, and the use of a gas tight lock or equivalent system for admitting the control rod to the reactor is not considered practical. The outer end 93 of the closure 87 is flanged and is bolted or otherwise fastened to a header plate 95 to provide a gas tight seal. The header plate 95 is adapted to be bolted to a cooperating plate 96 affixed to the outer shell 97 of the reactor 15 through another gas tight seal 98, as indicated particularly in Fig. 2. This construction effectively prevents any leakage of gas from the interior of the reactor 15 during operation of the control rod. The reactor moderating substance, which may comprise blocks of graphite, is indicated generally at 99 in the drawings.

When the reactor 15 is shut down the control rod 11 may, if desired, be disposed completely outside the reactor shell 97. Operation of the reactor 15 will be prevented at such times by suitable safety or other control rods which are in place within the reactor structure. When it is desired to put the reactor 15 into operation, the source of supply of liquid coolant, which may comprise any conventional pumping system, will be put into operation, the rod 11 will be moved into the reactor 15 to a position at which the reproduction factor will be less than unity when the safety or other control devices are withdrawn. Thereafter the safety rods are withdrawn. The operation of the reactor from this point on is completely under the control of the control rod 11, or a plurality of such rods, and the rod will be moved in or out of the reactor 15 by the use of a suitable power unit mechanically connected to the main drive shaft 53 by any suitable means. The auxiliary rack 57 together with the shaft 61 and gear 59 mechanically connected thereto provides a convenient means for continuously indicating the position of the control rod 11. In operation the device has proven particularly satisfactory.

An important feature of the invention consists in the tapering or rounding of the control rod 11 at the inner end thereof. This tapering and particularly the tapering of the active portion of the control rod (the cadmium foil 21) which has the same outline as the rod framework equalizes heating at the inner end of the control rod and thereby overcomes a difficulty which has been particularly troublesome in the past. While it is preferred that the entire control rod structure shall be tapered as shown in the drawings, it will be understood that considerable benefit can be obtained by merely tapering the inner end of the active portion of the rod.

Various cooling fluids may be used for cooling control rods of the above described type. For best results the fluid should be capable of withstanding neutron irradiation without change in its molecular structure. Ordinary water which may if desired contain neutron absorbing salts such as boron salts is suitable. The water, in addition to serving as a coolant, also increases the absorption efficiency of the control rod because it is a moderator, which reduces the energy of high energy neutrons which are present in the vicinity of the control member and might not otherwise be absorbed.

In the foregoing I have disclosed the features of a new and improved liquid cooled, control rod structure which is particularly adapted for controlling the operation of high capacity neutronic reactors. In accordance with the patent statutes, I have disclosed and described a particular embodiment of my invention. It will be understood, however, that considerable variation in the disclosed constructional details and arrangements are within the purview of the invention. The features of the invention which are believed to be new are expressly pointed out in the claims.

What is claimed is:

1. In a neutronic reactor system including a neutronic reactor, a control rod extending into said reactor, and means for longitudinally moving said control rod, the improvement wherein said control rod comprises an elongated member which is constructed at least in part of material having high neutron capture capabilities selected from the group consisting of cadmium and boron, said member being tapered at the inner end thereof, and there is provided on said rod a tube for containing a liquid coolant disposed in thermal conductive relationship with said member and rigidly affixed thereto to move therewith, and a framework supporting said member and said tube.

2. In a neutronic reactor system including a neutronic reactor, a control rod extending into said reactor, and means for longitudinally moving said control rod, the improvement wherein said control rod comprises a narrow, rectangularly shaped, laminated strip of sheet material, one of the laminations of said strip being of a material having high neutron capture capabilities selected from the group consisting of cadmium and boron, and there is provided a plurality of flat sided tubes for containing a liquid coolant disposed in flatwise contact with said laminated strip, and a framework which is generally rectangular in cross section supporting said strip and said tubes, said framework holding said tubes in pressure contact with said strip and at least said lamination which is of material having high neutron capture capabilities having a tapered inner end portion for minimizing heating at the inner end of said rod.

3. In a neutronic reactor system including a neutronic reactor, and a control rod extending into said reactor, the improvement wherein said control rod comprises a narrow, rectangularly shaped, laminated strip of sheet material, one of the laminations of said strip being of a material having high neutron capture capabilities selected from the group consisting of cadmuim and boron, and there is provided a plurality of flat sided tubes for containing a liquid coolant disposed in flatwise contact with said strip, and a framework which is generally rectangular in cross section, which supports said strip and said tubes, and which holds said tubes in pressure contact with said strip.

4. A control rod for use in connection with a neutronic reactor comprising a member which is constructed at least in part of material having high neutron capture capabilities selected from the group consisting of cadmium and boron, a tube for containing a liquid coolant disposed in contact with said member and rigidly affixed thereto to move therewith, and a framework supporting said member and said tube.

5. A control rod for use in connection with a neutronic reactor comprising an elongated strip of sheet material having high neutron capture capabilities selected from the group consisting of cadmium and boron, a flat sided tube for containing a liquid coolant disposed in thermal conductive relationship with said strip and rigidly affixed thereto to move therewith, and a framework for supporting said strip and said tube.

6. A control rod for use in connection with a neutronic reactor comprising a narrow, rectangularly shaped, laminated strip of sheet material, one of the laminations of said strip being of a material having high neutron capture capabilities selected from the group consisting of cadmium and boron, a plurality of flat sided tubes for containing a liquid coolant disposed in flatwise contact with said laminated strip, and a framework which is generally rectangular in cross section supporting said strip and said tubes and holding said tubes in pressure contact with said strip.

7. A control rod for use in connection with a neutronic reactor comprising a cadmium sheet, a tube for containing a liquid coolant disposed in thermal conductive relationship with said sheet and rigidly affixed thereto to move therewith, and a framework for supporting said sheet and tube.

8. A control rod for use in connection with a neutronic reactor comprising a narrow, elongated strip of sheet cadmium which is sandwiched between two strips of sheet aluminum, a flat sided aluminum tube for containing a liquid coolant disposed in contact with one of said aluminum strips, and an aluminum framework for supporting said strips and said tube.

9. A control rod for use in connection with a neutronic reactor comprising an elongated member of material having high neutron capture capabilities selected from the group consisting of cadmium and boron, said member being tapered at the inner end thereof, a tube for containing a liquid coolant disposed in thermal conductive relationship with said member and rigidly affixed thereto to move therewith, and an elongated framework supporting said member and said tube.

10. A control rod for use in connection with a neutronic reactor comprising a narrow, elongated, laminated strip of sheet material, one of the laminations of said strip being of a material having high neutron capture capabilities selected from the group consisting of cadmium and boron, said laminated strip being of substantially uniform width except for the inner end thereof which is tapered, a flat sided tube for containing a liquid coolant disposed in contact with said strip, and a framework for supporting said strip and said tube.

11. A control rod for use in connection with a neutronic reactor comprising a narrow, rectangularly shaped strip of sheet material having high neutron capture capabilities selected from the group consisting of cadmium and boron, which is sandwiched between two similarly shaped strips of sheet material having lower neutron capture capabilities, a plurality of square sided tubes containing a liquid coolant disposed with one side thereof in flatwise contact with said strips, and a framework which is generally rectangular in cross section for supporting said strips and said tubes, said framework holding said tubes in pressure contact with said strips, and said strip which is of material having high neutron capture capabilities having a tapered inner end portion for minimizing heating at the inner end of said rod.

12. In a neutronic reactor system including a neutron moderator, a fissionable material disposed in the moderator in an amount sufficient to establish a neutron chain reaction, and a movable non-fissioning neutron absorber selected from the group consisting of boron and cadmium extending into the reactor and removable therefrom, the improvement comprising a tube in contact with the neutron absorber and rigidly affixed thereto to move therewith, and means for flowing a fluid through said tube, whereby heat generated in the neutron absorber by neutron absorption is removed by the flowing fluid.

13. In a neutronic reactor system including a neutronic reactor, a neutron absorbing control rod containing material having a high neutron absorption selected from the group consisting of boron and cadmium extending into said reactor, and means for longitudinally moving said control rod, the improved construction wherein a tube for water is rigidly affixed to the control rod along substantially the entire length thereof, whereby the absorption efficiency of the control rod is increased.

References Cited in the file of this patent

UNITED STATES PATENTS

| | | |
|---|---|---|
| Re. 18,182 | Booth | Sept. 8, 1931 |
| 889,756 | Bukacek | June 2, 1908 |
| 1,343,014 | Troutman | June 8, 1920 |
| 1,594,061 | Jones | July 27, 1926 |
| 2,064,141 | Askin | Dec. 15, 1936 |
| 2,366,168 | Bakarian | Jan. 2, 1945 |

FOREIGN PATENTS

| | | |
|---|---|---|
| 114,150 | Australia | May 2, 1940 |
| 114,151 | Australia | May 3, 1940 |
| 233,011 | Switzerland | Oct. 2, 1944 |